June 10, 1941.　　　　W. B. BELL　　　　2,244,657
POWER TRANSMISSION MECHANISM
Filed Aug. 29, 1939　　　　7 Sheets-Sheet 7
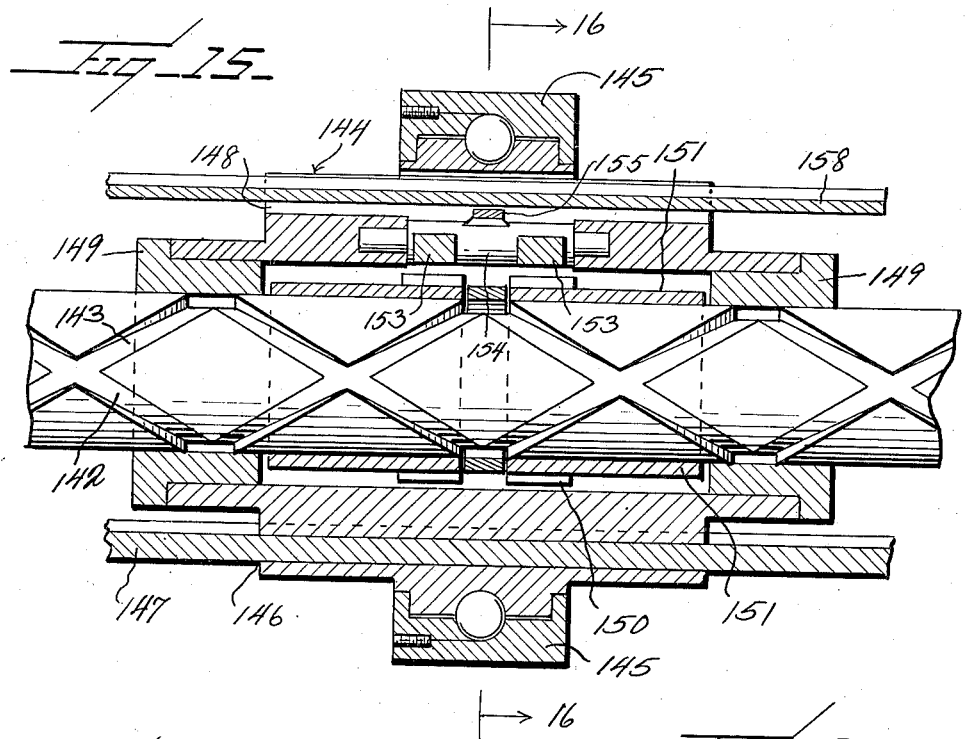
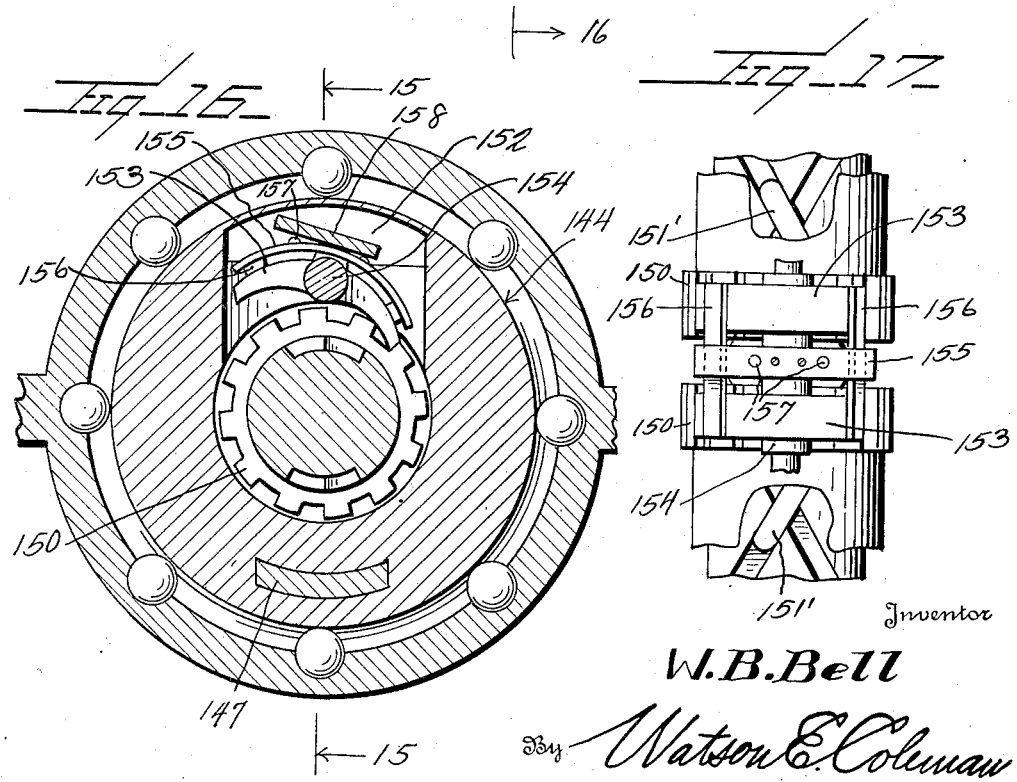
Inventor
W. B. Bell
By Watson E. Coleman
Attorney Patented June 10, 1941

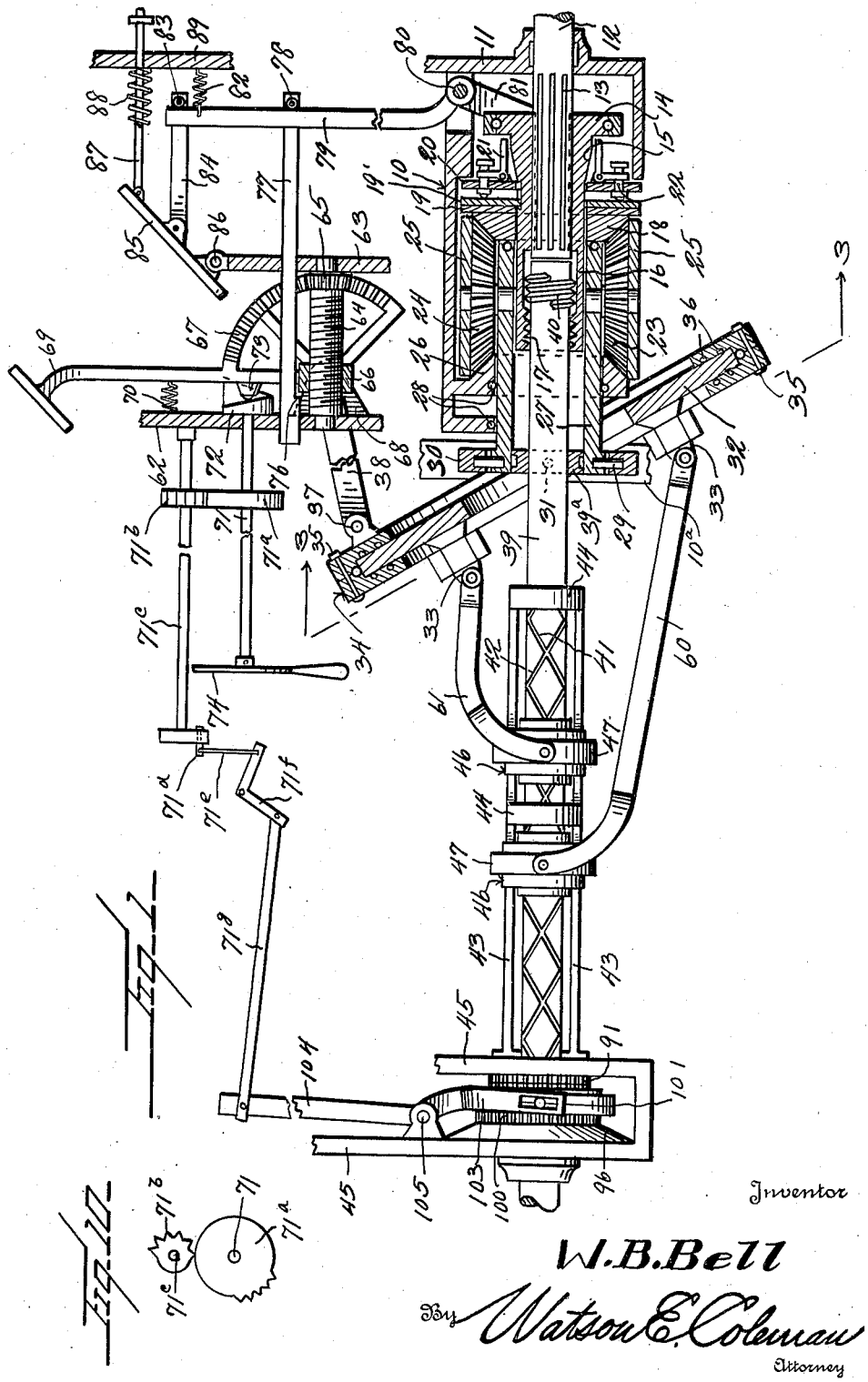

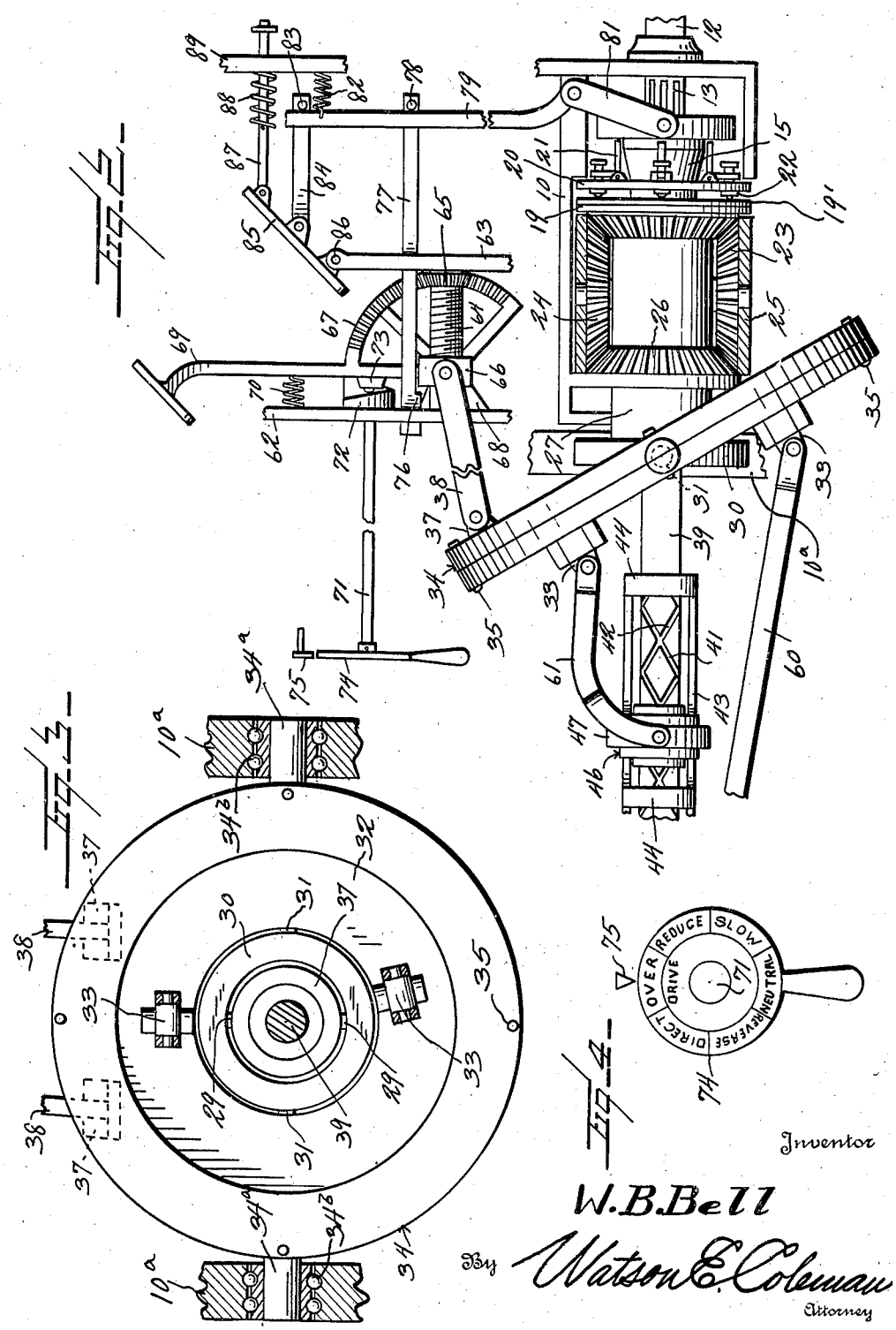

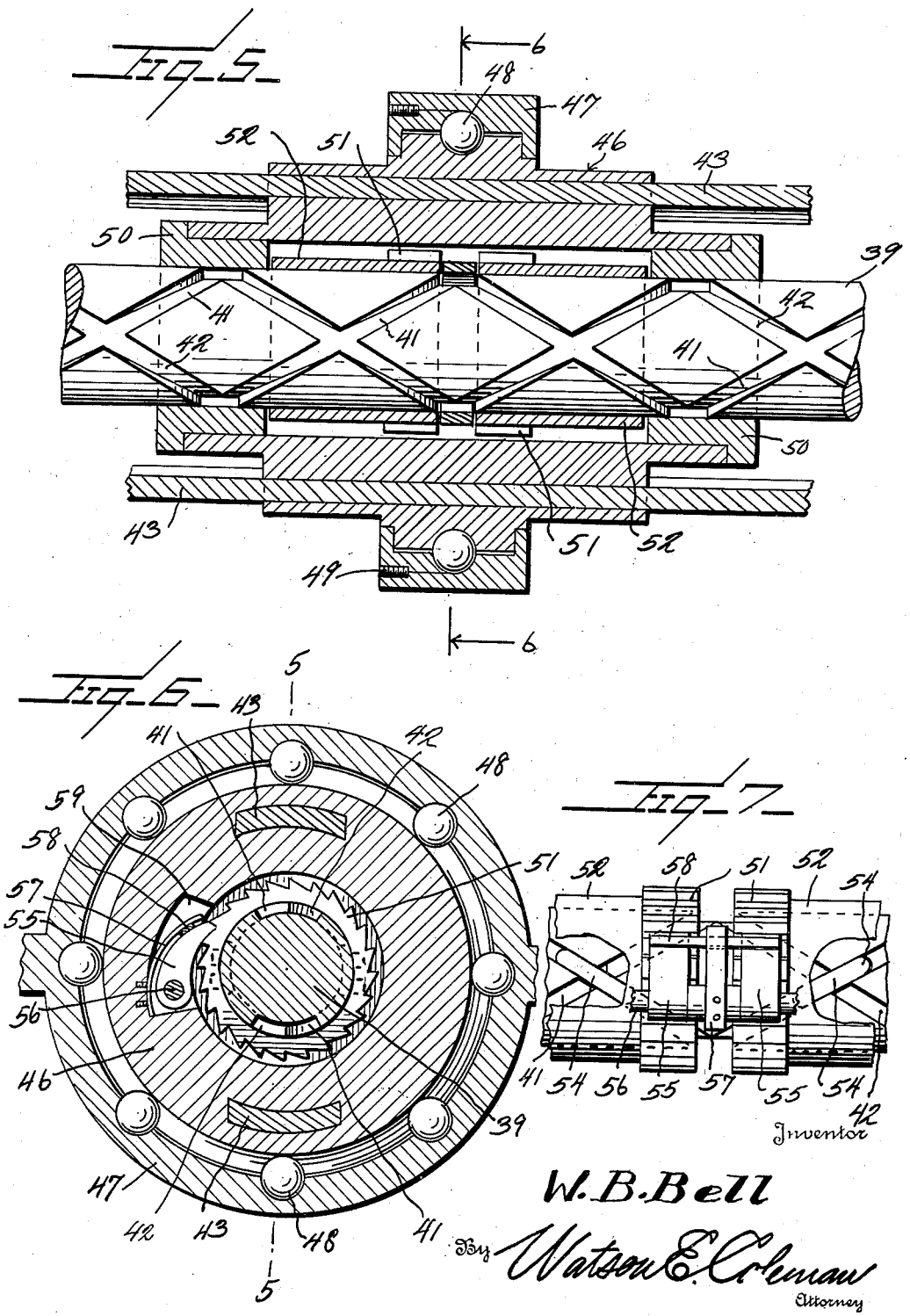

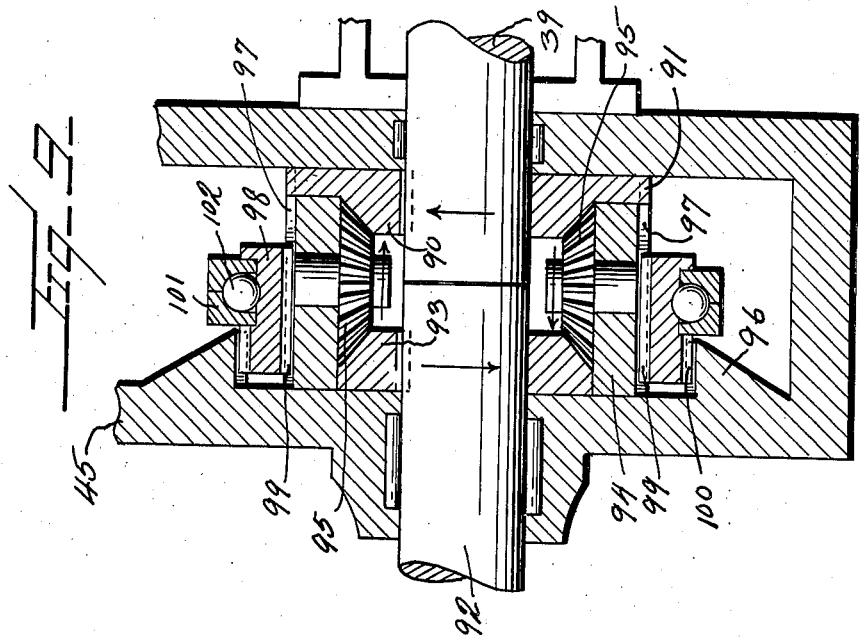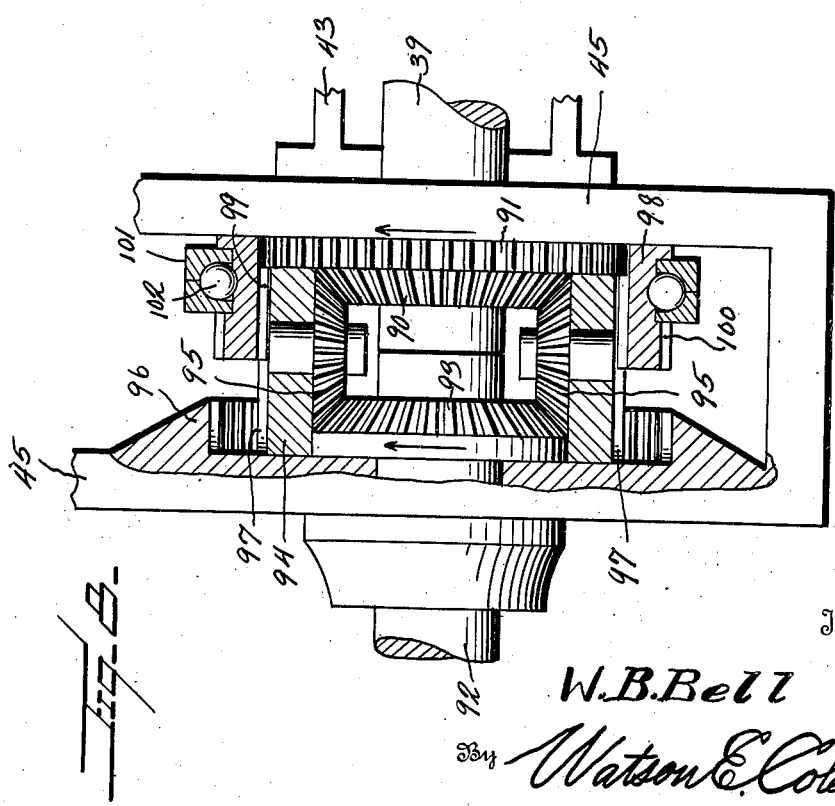

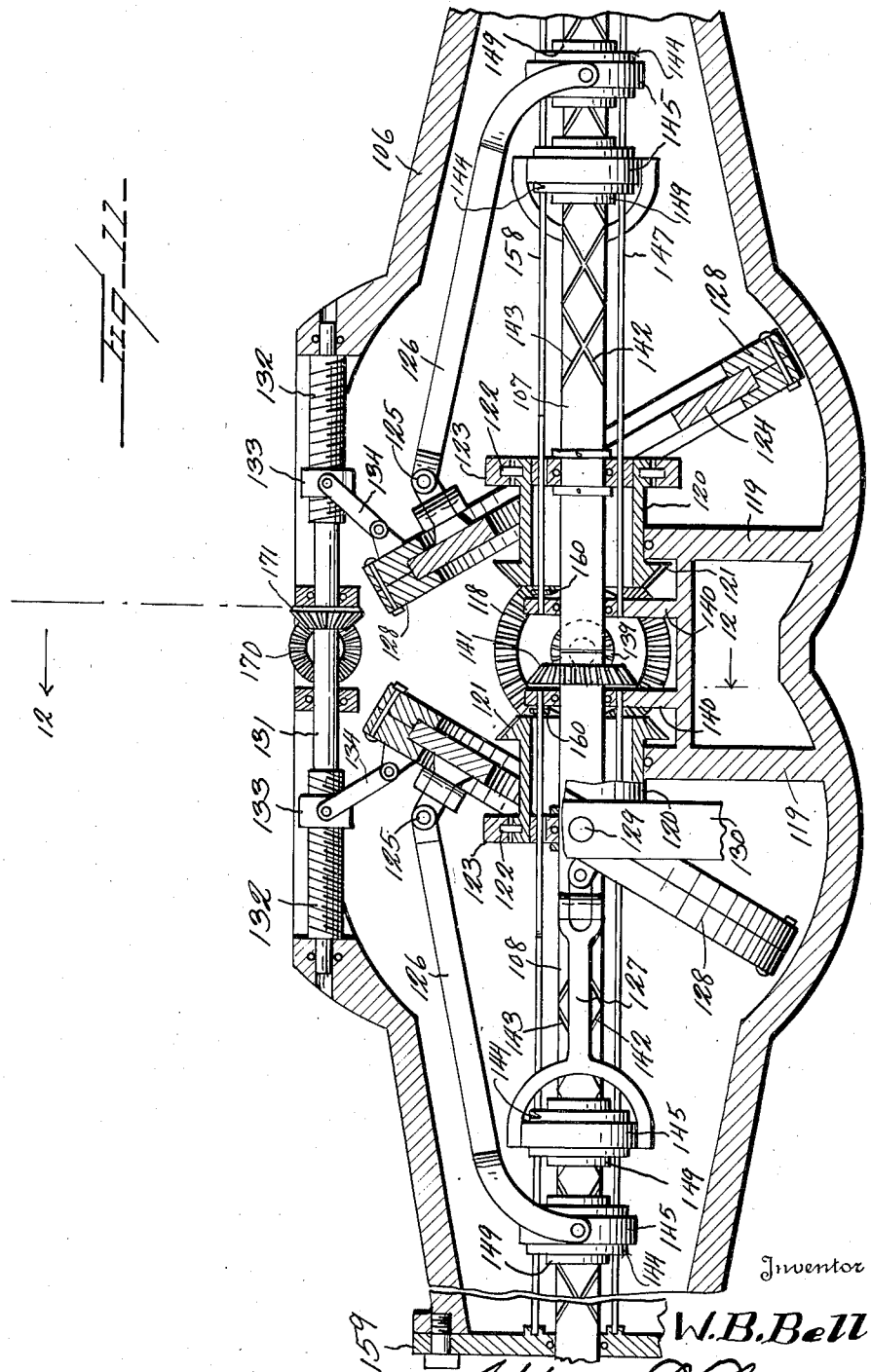

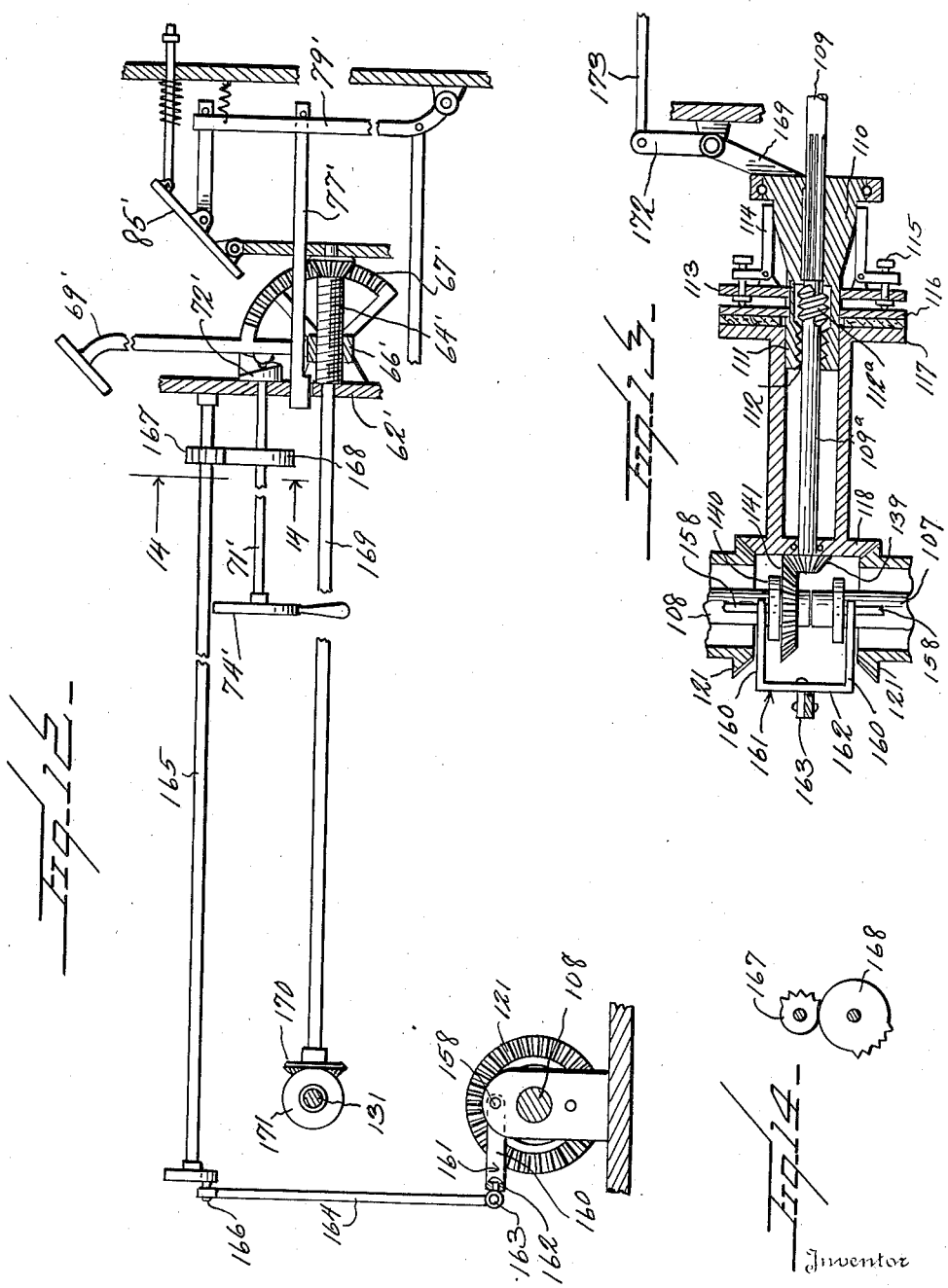

2,244,657

UNITED STATES PATENT OFFICE 2,244,657

POWER TRANSMISSION MECHANISM

William Brown Bell, San Juan, P. R., assignor to Progress, Incorporated, a corporation of Puerto Rico Application August 29, 1939, Serial No. 292,476

24 Claims. (Cl. 74—112)

This invention relates to mechanism for the transmission of power from one rotated shaft to another and particularly to means of this character which will include speed ratio controlling mechanism.

The general object of the invention is to provide a change speed transmission gearing so constructed as to secure changes in speed ratio between the driving and the driven shaft without the necessity of using the usual change speed mechanism or change speed gears with all the objectionable features thereof, and further in this connection to provide means whereby the ratio of speed transmission may be changed smoothly and gradually from full speed to a neutral position with the driving shaft operating and the driven shaft still.

A further object is to provide transmission mechanism by which any desired speed ratio between the driving and driven shafts may be obtained and whereby the driven shaft may be driven either directly or indirectly from the driving shaft.

A still further object is to provide means whereby to "set" or adjustably limit the maximum speed of the driven shaft, this mechanism, however, permitting the immediate reduction of speed from the limited maximum to a minimum or neutral position.

Other objects will appear in the course of the following description.

My invention is illustrated in the accompanying drawings wherein—

Fig. 1 is a longitudinal sectional view of my transmission mechanism, the driven shaft and the travelers and the coacting differential being shown in elevation.

Fig. 2 is a fragmentary elevation of the structure shown on the right-hand side of Fig. 1.

Fig. 3 is an elevation of the rotating disk and its housing, the driven shaft being shown in section.

Fig. 4 is an elevation of the indicator whereby the various speeds are secured.

Fig. 5 is an enlarged sectional view on the line 5—5 of Fig. 6 of one of the travelers, the driven shaft being shown in section.

Fig. 6 is a section on the line 6—6 of Fig. 5.

Fig. 7 is a fragmentary elevation partly broken away of the ratchet rings and their sleeves and the pawls coacting therewith.

Fig. 8 is a fragmentary section partly in elevation of the differential gear between the driven shaft and the shaft leading back and operatively connected to the wheels of the vehicle or other driven mechanism, the figure showing direct drive.

Fig. 9 is a vertical sectional view of the structure shown in Fig. 8, the section being taken on a medial plane and showing the manner in which the driven shaft is reversely coupled to the shaft leading to the driving wheels of the vehicle, or other driven mechanism.

Fig. 10 is a view in elevation of the broken or mutilated gears used in connection with the reversing mechanism.

Fig. 11 is a view illustrating the use of the transmission mechanism for transmitting power from a drive shaft to a right angularly related driven shaft, the same being shown as forming a rear axle structure for a motor vehicle, parts of the mechanism with the axle housing being in section.

Fig. 12 is a section taken on the line 12—12 of Fig. 11 through the mechanism only, showing the connections between the control or indicator disk and the reversing mechanism which forms a part of the travelers.

Fig. 13 is a sectional view taken at right angles to the section line of Fig. 12 and showing only the mechanism lying in the transverse center of the structure shown in Fig. 11 between the rotating disks.

Fig. 14 is a detailed view of a gear connected with the reversing control rods.

Fig. 15 is a sectional view through one of the travelers shown in Fig. 11, the section being taken on the line 15—15 of Fig. 16.

Fig. 16 is a sectional view on the line 16—16 of Fig. 15.

Fig. 17 is a plan view of the double pawls, in association with the adjacent ratchet gears, the actuating rod for the pawls being removed.

Referring to the drawings, 10 designates generally a fixed supporting frame having an end wall 11. Entering through the end wall and supported in bearings therein is the driving shaft 12 having keys or splines 13. Slidingly mounted on the driving shaft but splined thereto is a clutch actuating element 14 having a tapered circumferential face 15. Beyond this tapered portion, the element 14 has a tubular extension 16 formed at its extremity with the internal screw threads 17, whose function will be later described.

Mounted on the element 14 is a beveled gear wheel 18 which is freely rotatable about the element and against the forward face of this beveled gear is positioned a pair of friction clutch disks 19 and 19', made of fibre or other suitable material and the disk 19 adjacent the gear wheel is loose on the element 14 while the forward disk 19' is coupled with the element 14 by a key or other suitable means. Mounted on and connected with the element 14 to be turned thereabout is a disk 20 carrying on its forward face bell crank levers 21 engaging with studs 22 which are movable through the disk 20. The forwardly extending arms of the levers 21 are adapted to be forced outward by the cone-shaped portion 15 of element 14 when the latter is forced rearward, that is, to the left in Fig. 1, into the position shown in this figure, thus through the studs 22, forcing the clutch disks 19 against and into clutching engagement with the beveled gear 18.

The beveled gear wheel 18 forms one of the gear wheels of a differential and meshes with the opposed beveled gear wheels 23 and 24, which are carried upon a rotatable annular housing or carrier 25. The beveled gear wheels 23 and 24 mesh with a fixed beveled gear wheel 26 forming part of the frame 10. The inner trunnions of the gears 23 and 24 are mounted in a rotatable sleeve 27, rotatable in bearings 28, and at its end having opposed radial pivot pins 29 for engagement with a gimbal ring 30 which in turn is pivoted upon the pivot pins or trunnions 31 to a disk-like ring 32 which is provided upon its rear face with two knuckles 33. The rim of the annular disk 32 is rotatably mounted in an annular housing 34 formed of two annular sections held together by bolts 35 and having antifriction bearings 36. The housing 34 has opposed radially extending pivot pins 34ª and these pins are mounted in suitable bearings 34ᵇ which in turn are supported in suitable fixed supporting frames 10ª disposed at the sides of the mechanism. The pivot pins or trunnions 34ª extend transversely of the mechanism so that the frame may turn on an axis facilitating its movement from a vertical position to an inclined oblique position with respect to the center of rotation of the shaft 12. This housing carries knuckles 37 on its forward face connected by links 38 to means for adjustably tilting the housing which will be later described.

Disposed in alinement with shaft 12 is a driven shaft 39 which is rotatably mounted in suitable bearings 39ª within the cylindrical extension of the clutch operating element 14 and has on it the screw threads 40 which are adapted to be engaged by the threads 17 for a purpose to be later stated. The driven shaft 39 has cut in it the reversely inclined helical double threads 41 and 42, see Fig. 5, and extending parallel to the shaft but held from rotation, are the guides 43 which carry collars 44 through which the shaft 39 passes. At the rear ends these guides are attached to the fixed frame 45.

Reciprocating on shaft 39 are the travelers designated generally 46. There are two of these travelers illustrated, but more than two may be used. I have only shown two in order to avoid confusion. Each traveler is rotatably mounted within a ring 47 and has ball bearings 48. Each ring is in two sections to permit the insertion of the balls 48 and these sections are held together by the screws 49. Each traveler constitutes in effect a reciprocating nut acting as it is moved longitudinally to rotate shaft 39 in one direction.

Each traveler has longitudinally extending passages for the guides 43 so that it is held from rotation. At its ends each traveler is supported by bearing bushings 50 which slide on shaft 39.

Disposed within each traveler are two ratchet rings 51 each carried by a collar 52, the collars extending in opposite directions. Each collar has secured to its inner face the elongated studs 54 which are two in number for each collar and are disposed opposite one another, the studs of each collar extending obliquely thereof and those studs of one collar being arranged to extend in opposite directions to the studs of the other collar to engage separate threads 41 or 42. By this arrangement the force exerted by each stud tending to rotate the traveler is counterbalanced by the other studs as the traveler moves longitudinally to rotate the shaft. The ratchet rings 51 are prevented from turning in a counterclockwise direction in Fig. 6 by the double pawls 55 mounted within the traveler upon a common shaft 56 and urged inward by a spring 57 secured to the traveler and bearing against a cross spring 58. These pawls and springs are accommodated within a recess 59 formed in the traveler 46, as shown in Fig. 6.

As previously stated, the disk 32 carries upon its rear face two knuckles 33 which are spaced as shown in Fig. 3, so that they will not be diametrically opposite, and as has also been stated, there are two travelers 46 and these are connected to the knuckles 33 of disk 32 by links 60 and 61. The travelers 46 may alternately move toward and from each other or they may move in the same direction at times depending on the location of the knuckles 33. It will be understood that the disk 32 rotates in its own plane within the housing 34, the change of this plane and the extent of the throw of the travelers 46 being determined by the angularity of the housing 34. As previously stated, the knuckles 33 are set so as not to be diametrically opposite, this arrangement being employed to avoid the travelers reaching the ends of their strokes at the same moment and thereby causing a dead spot in the transmission of power. These knuckles may be set in any relatively angular relation as, for example, they may be placed substantially 90° apart, in which case one traveler would be in the middle of a stroke while the other one is at the end of its stroke or the dead spot. It is possible to employ three knuckles and travelers, if desired, in which case the knuckles would be equi-distantly spaced around the rotating disk for better balance of the disk and smoother action of the travelers.

The means for adjusting this housing at any desired angle is illustrated particularly in Figs. 1, 2 and 4. At a suitable location with respect to the frame 10 and the mechanism associated therewith, there are provided suitable supporting frames 62 and 63 between which is rotatably mounted a screw 64 which carries gear wheel 65 at its forward end, this screw being arranged to extend in the same direction as the shafts 12 and 39. Mounted upon this screw is a nut 66 which as the screw is rotated, moves either forwardly or rearwardly depending upon the direction in which the screw is rotated. For the purpose of rotating this screw 64, I provide the arcuate rack 67 which engages the gear wheel 65. This rack is mounted upon a bracket 68 which is connected to a pedal 69. A spring 70 urges this pedal toward the left in Fig. 1. Mounted upon a shaft 71 is a cam 72 having a spiral cam face adapted to engage with a stud 73 carried by the rack 67. It will be seen from Fig. 1 that the pedal 69 may move toward the right in this figure independently of the cam 72 by depressing the pedal 69 but that a rotation of the cam will also act to shift the segment gear 67 a certain distance and will particularly act to limit the inward movement of the pedal 69 and thus limit the adjustment of the segment 67 and the adjustment of the nut 66 on the screw 64.

In Fig. 1, the cam 72 is illustrated in what I have termed its over-drive position. (See Fig. 4.) In this position of the parts, the shaft 39 is rotating at a greater speed than the drive shaft 12, and I have called this the over-drive position. This is the position shown in Figs. 1 and 2. If the cam 72 be turned toward the left or in a clockwise direction with reference to Fig. 1, the segment gear 67 is shifted, which turns the screw 64 and shifts the nut 66 so as to pull the housing 34 and the disk 32 nearer to a vertical position and speed will be accordingly reduced. If the lever 69 be forced still further forward, the nut 66 will be shifted to a slow speed position and if the lever be still further forced forward, the nut will be shifted along the shaft 64 to a position where the rotating disk 32 will be vertical, that is, at right angles to the shaft 39, which will be its neutral position.

In order to secure a direct drive between shaft 12 and shaft 39, the indicator disk 74 on shaft 71 is turned so as to bring the word "direct" immediately beneath the pointer 75. This will cause a reverse movement of the cam 72 and will bring the lowest portion of this cam opposite the stud 73. The spring 70 will then urge the pedal 69 rearward and this will shift the nut 66 further to the left in Fig. 1, engaging a shoulder 76 on a rod 77. This rod at its rear end has a stop 78 to engage a lever 79 mounted upon a shaft 80. This shaft has extending from it an arm 81 which engages the clutch shifting element 14. Thus when the rod 77 is pulled to the left in Fig. 1 by the nut 66, the stop 78 engages the lever 79 and pulls it rearward against the action of the spring 82 and this shifts the clutch shifting element 14 forward, releasing the friction clutch 19 and thus stopping the action of the differential gears 18, 23 and 24. Thus the sleeve 27 is no longer rotated. The retraction of the clutch element 14 brings its screw threads 17 into engagement with the screw threads 40 and shaft 39 and as soon as these screw threads catch, they shift the element 14 forward and when the screw threads 17 have fully engaged the screw threads 40, the clutch element 14 will cause the rotation of the shaft 39. Thus the shaft 12, the clutch element 14 and the shaft 39 will all rotate in the same speed and the direct drive will be transmitted to the final driven shaft through mechanism which will be later described.

In effecting the direct coupling for direct drive between the shaft 12 and the shaft 39, the speed of rotation of the driving shaft 12 would naturally be reduced and thus as the tubular extension 16 is drawn forwardly by the shifting of the element 14, the threads 40 on the shaft 39 which would be turning faster than the shaft 12 will engage with the threads 17. Since the element 14 is held in its forward position by the setting of the cam 72 and the parts 66, 77 and 79, it will be apparent that when the driving shaft 12 is speeded up, disconnection of the threads 17—40 cannot occur and, therefore, direct rotation will be transmitted from shaft 12 to shaft 39.

The disengagement of the threads 17 and 40 may be automatically accomplished by causing the driving shaft to revolve faster than the driven shaft, after releasing the element 14 so that it may move rearwardly. As soon as the lever 77 releases arm 79 after the cam 72 has been turned back to over-drive position, the element 14 will be free to move rearwardly and, therefore, if the speed of the driving shaft is increased, the natural separation of the threads 17—40 will take place. If no power is applied to the driven shaft, it will naturally slow down and when power is applied to the driving shaft causing it to revolve faster than the driven shaft, the disengagement described will come about.

The spring 82 normally draws the lever 79 to the right in Fig. 1, that is, to the position shown in Fig. 1, and against a stop 83 carried upon a rod 84, which is pivoted to a pedal 85. This pedal is pivotally mounted upon a supporting frame at 86. The upper end of the pedal carries a rod 87 and spring 88 bears against the panel or upright 89 and forces the rod 87 rearward to normally hold the pedal 85 in the position shown in Fig. 1. This pedal 85 may be called the throttle pedal. When this pedal is released to its normal position, as shown in Fig. 1, the motor braking power is not applied, but if said pedal 85 is further released, the lever 79 is pulled over sufficiently to allow the threads 40 to engage the threads 17. The fact that the element 14 and shaft 12 are revolving slower than the main shaft 39 allows the complete engagement of the screw threads 17 and 40. This, as before explained, secures direct connection between the drive shaft 12 and the driven shaft 39. As soon as the speed of the drive shaft 12 becomes greater than the speed of the main shaft or driven shaft 39, by depression of the throttle lever 85, the screw threads 17 and 40 automatically disengage, forcing the clutch disks 19 to close and power is transmitted through the differential gears, the universal 29, the disk 32 and the ratchet mechanism to the driven shaft 39.

The particular purpose of the cam 72 is to do away with the necessity of holding the lever 69 in its adjusted position at all times. Inasmuch as the spring 70 draws the lever 69 rearward and forces the stud 73 against the face of the cam 72, it follows that this cam will always act as a limiting stop.

In Figs. 1, 8 and 9, I have illustrated the means whereby a car or other mechanism driven through this transmission may be put in reverse. 45 designates a supporting frame as previously stated, and disposed within this frame and mounted upon the shaft 39 is a beveled gear wheel 90 fast upon the shaft 39. This beveled gear wheel 90 has formed with it the relatively larger spur gear wheel 91. Disposed in bearings in the frame 45 and alined with the shaft 39 is a second driven shaft 92 which carries upon it the beveled gear wheel 93. Concentric to the shafts 39 and 92 and to the beveled gear wheels thereon is a carrier ring 94 which carries the beveled gear wheels 95 meshing with the gear wheels 90 and 93. The frame 45 on that side of the frame adjacent the beveled gear wheel 93 is formed with a fixed gear ring 96 having internal teeth. The carrier 94 is provided with slideways 97 and surrounding the carrier 94 is an annulus 98 having teeth 99 which engage in these slideways 97 so that the ring 98 may have a rectilinear sliding movement. These teeth 99 also are adapted to engage with the teeth on the gear wheel 91. The ring 98 is also provided upon its outer face with teeth 100 which, when the ring is shifted to the position shown in Fig. 9, engage with the internal teeth of the internal gear 96. When the ring 98 is shifted to the right, as in Fig. 8, it will mesh with the teeth of the gear wheel 91 and rotate with this gear wheel. When, however, it is shifted to the position shown in Fig. 9, the teeth 100 will engage the teeth of the internal gear 96 and the ring 98 will be held from rotation. For the purpose of shifting this ring 98, I provide the shipper ring 101 having ball bearings 102 engaging with the ring 98, this shipper ring in turn being engaged by the yoke 103 on a shipper lever 104 pivotally mounted at 105 on the frame 45. When the ring 98 is shifted to the position shown in Fig. 8, the ring may rotate with the gear wheel 91 and will transmit rotation to the carrier 94. The gear wheels or pinions 95 will thus be held stationary and the rotation of the shaft 39 in the direction of the arrow in Fig. 8 will cause a like rotation of the shaft 92, as shown by the arrow in Fig. 8. When the parts are in the position shown in Fig. 9, however, the carrier 94 will be held from rotation and the beveled gear wheel 99 will cause the pinions 95 to rotate in the direction of the arrows in Fig. 9, and this will cause a rotation of the gear wheel 93 in the direction of the arrow in Fig. 9, thus causing a reverse rotation of the shaft 92 with relation to the shaft 39.

The shipper lever 104 is controlled by the rotatable element 74 in the manner illustrated in Fig. 1. This control consists of a broken tooth gear 71ª mounted upon the shaft 71, which is designed for coaction with a broken tooth pinion 71ᵇ which is supported upon a shaft 71ᶜ. This shaft is operatively coupled with the shipper lever 104 in a suitable manner whereby upon rotation a pull or push will be imparted to the latter lever so as to shift the reversing mechanism in the desired direction. The coupling means here illustrated comprises an eccentric 71ᵈ which is connected by a link 71ᵉ with one arm of a bell crank 71ᶠ, the other arm of the bell crank being coupled by a link 71ᵍ with the shipper lever as shown. The teeth of the gears 71ª and 71ᵇ are so arranged that they will not come into mesh until the handle of the rotatable element 74 is turned in a counterclockwise direction to bring the word "reverse" into coincidence with the pointer 75, and when the teeth are so coupled, rotary motion will be imparted to the shaft 71ᶜ and the shipper lever, which is now shown in the position where the mechanism of Figs. 8 and 9 is in forward drive position, will be shifted to the position shown in Fig. 9, so as to effect a reversal of the rear part 92 of the driven shaft. The reversing mechanism as now shown in Fig. 1 is in neutral position, therefore, it will be readily apparent, when referring to Figs. 8 and 9, that by shifting the lever 104 forwardly, the gear 98 will be shifted to the rear into the position shown in Fig. 9 so that the shafts 39 and 92 will be coupled for opposite rotation.

It will be understood from Figs. 5, 6 and 7 that on the forward stroke of either of the travelers 46, the left-hand sleeve 52 in Fig. 5 will revolve to the right together with shaft 39, while the pawls 55 slide over the ratchet teeth on the ratchets 51. During this time, the right-hand sleeve 52 is held stationary by the corresponding pawl. On the back stroke or reverse stroke, the right-hand sleeve turns to the right with the shaft 39 and the pawl slides over the ratchet teeth while the left-hand sleeve is held stationary by the pawl. It will thus be seen that the shaft 39 always revolves to the right on both the forward and backward strokes. There is practically no lost motion in this type of ratchet and spiral and both the forward and reverse strokes are working strokes.

It will be noted that a much greater reduction in the speed of the disk 32 may be obtained by enlarging the differential gears 23 and 24 and/or decreasing the diameters of gears 18 and the fixed gear 26. This decrease in the speed of the disk 32 may be fully or more than fully regained in the driven shaft 39 by giving the spiral grooves 41 and 42 the proper angle to secure the corresponding revolutions of shaft 39 when the travelers 46 have completed one forward and one back stroke which corresponds to one complete revolution of the disk 32. As compared to other transmissions, this transmission is particularly simple and has a minimum of moving parts without any loss in efficiency. This transmission has an infinite number of speed changes within its range without manipulating any parts of the apparatus other than the lever or pedal 69. My mechanism eliminates a number of speed change gears with their very limited number of speeds. It will be seen that I have provided for a large reduction in the speed of the working parts thereby reducing friction and wear of such parts and that I secure complete stoppage of all working parts, other than the main shaft when the driven shaft 39 is directly coupled with the driving shaft 12. I have also provided a reversing mechanism which cannot be changed until the forward speed has been stopped. With my construction, the braking power of the motor can be used or not used, as desired. There is no lost motion or lost power when speed changes are made. These changes can be very gradual and thus this speed changing mechanism is particularly applicable to motor cars driven in traffic where there is likelihood of constant speed changes being necessary. It will be seen that the provision of the ratchet and pawls on the travelers with the spiral grooves on the driven shaft prevents any reverse motion of this driven shaft.

The invention as thus far described may also be conveniently employed as a double unit for application to a mechanical structure having two driven shafts such, for example, as in the rear end of a motor vehicle wherein there are the two alined axles each connected with a wheel. In this arrangement, the driving shaft would be disposed at right angles to the driven shafts. The principal feature of this arrangement when applied to motor vehicles is to confine the transmission mechanism in the rear axle housing thereby eliminating the conventional clutch, transmission and differential. This double unit arrangement as hereinafter described provides at each side of the differential gears an independent drive for each rear wheel of the motor vehicle or a direct drive might be obtained through one wheel only when the control mechanism is placed in the direct drive position.

The arrangement referred to is illustrated particularly in Fig. 11. In this figure, the numeral 106 designates a housing such as might be found in the rear end of a motor vehicle while the two driven shafts corresponding with the rear axles of the motor vehicle are indicated by the numerals 107 and 108. The drive shaft, corresponding with the shaft 12 of Fig. 1 is indicated at 109, and as shown, this shaft has an auxiliary terminal portion 109ª which enters the housing at the transverse center and in line with the inner ends of the driven shafts, and the shaft 109 passes through the cone 110 which at its inner end has a tubular extension 111 which is interiorly threaded as at 112. Surrounding the outer end of the tubular portion 111 and keyed thereto for rotation therewith is a disk 113, which carries the clutch shifting arms 114 corresponding with the arms 21 of Fig. 1 and actuating, through the medium of pins 115, a clutch disk 116 relative to a similar disk 117, which is securely coupled with a beveled driving gear 118, as shown in Fig. 13, which is located in the central part of the housing. The disk 116 is keyed to the rotating cylindrical extension 111 of the cone for movement thereon relative to the gear attached disk 117.

The forward end of the auxiliary portion 109a of the shaft 109 carries threads 112a which correspond with the threads 40 of the structure of Fig. 1, and which in the establishment of the direct drive connection are engaged with the threads 112 in the tubular portion of the cone body 110, as hereinafter described.

Supported within the housing 106 in suitable bearing frames 119 are the rotary sleeves 120 which correspond to the sleeve 27 of Fig. 1, these sleeves having mounted upon their adjacent ends the beveled gears 121 which are in mesh with the gear 118. At their outer ends the sleeves 120 carry the oppositely directed pivot or trunnion pins 122 which are pivotally engaged in the encircling gimbal ring 123 which is in turn within and concentric with the annular rotary disk 124. These disks, like the disk 32, carry ears 125 upon the faces which are directed toward the adjacent ends of the housing in which they are enclosed, these ears having pivotally connected therewith the pitman arms 126 and 127, which correspond respectively with the arms 60 and 61 of Fig. 1.

Each of the disks 124 is enclosed within an annular housing 128 which is supported by suitable diametrically spaced trunnions 129, upon supporting or bearing parts 130 which are fixed in the housing.

Within the housing 106 there is rotatably supported, preferably above the rockable housings 128, a shaft 131 which at opposite sides of the transverse center of the housing is provided with the screw threads 132 on which runs a nut 133. These screw threads are of opposite hand and the nuts supported on the shaft are so related that when the shaft is turned in one direction, they may be both moved to the inner ends of the threads or when the shaft is turned in the opposite direction, they may be shifted to the outer ends thereof, and these nuts are connected by links 134 with the adjacent annular housing 128. These nuts 133 shift the housings in a manner similar to the nut 66 of Fig. 1 and are actuated by mechanism of the character shown in Fig. 1, through an intervening coupling hereinafter described.

The portion 109a of the shaft 109 extends through the center of the gear 118 and is designed to have independent rotation therewith, and within the area defined by the beveled gears 118—121, the drive shaft extension 109a carries a gear pinion 139.

The driven shafts or axles 107—108 extend through the beveled gears 121 and are supported within the area between these gears by suitable bearings 140 and one of the axles, here shown as the axle or driven shaft 108, carries a beveled gear 141 which is in mesh with the gear pinion 139 whereby when the cylindrical portion of the cone 110 is coupled with the driving shaft extension 109a, a direct drive may be established between the driving shaft and the driven shaft 108.

The shafts 107—108 are each provided with the reversely inclined helical double threads 142 and 143, and each driven shaft passes through a traveler 144 which corresponds with the travelers 46, but which has a slightly different interior construction from the travelers 46, as will be hereinafter described.

Like the travelers 46, each of the travelers 144 is rotatably mounted within a ring 145, these rings being in two sections to permit insertion of the necessary anti-friction balls.

Each traveler has a longitudinally extending passage 146 for the reception of a fixed guide 147 and upon the opposite side from the passage 146 is a relatively large longitudinally extending passage 148, the use of which will be hereinafter described.

Within each end of each traveler is a bearing bushing 149 which rests upon the shaft on which the traveler moves and within each traveler are the two ratchet rings 150 which encircle the adjacent shaft and which are carried upon collars 151 corresponding with the collars 52. The ratchet rings 150 in this form are, however, provided with square teeth rather than with tapered or pointed teeth, as illustrated and described in connection with the traveling units 46 and in the upper part of each traveler, a chamber 152 is formed which is in communication with the longitudinal passage 148 and which houses a pair of double pawls 153. These double pointed pawls are rockably mounted upon a suitable supporting pin 154 which extends through the chamber 152 lengthwise of the traveler and secured to and transversely of the pin 154 is a leaf spring 155 which at its ends bears against the spring cross bars 156 which connect the adjacent ends of the pair of double pawls which, as shown in Fig. 17, are in parallel relation and extend transversely of the adjacent shaft.

In the top of the leaf spring 155 is secured a pair of anti-friction balls 157, the use of which will be presently disclosed.

It has previously been stated that the shafts 107 and 108 are provided with the spiral crossed grooves 142 and 143 like the shaft 39 of the structure shown in Fig. 1, and also that each of the followers 144 has encircling it the pair of square tooth ratchets 150, each of which is carried on a collar 151. It will, therefore, be apparent that the collars 151 are coupled with their respective shafts through the medium of a pair of elongated studs 151' which are secured to the inner surfaces of the collars like the studs 54, the studs 151' of each pair being oppositely located on the collar.

Extending lengthwise through the casing 106 are the two alined bars 158, the outer ends of which are rotatably supported in the bearing plates 159 which close the ends of the casing 106, while the inner ends of these bars are rotatably supported in the part 140 of the casing structure which supports the inner ends of the shafts 107—108. These bars 158 pass through the rotatable supporting cylinders 120 upon the outer ends of which the gimbal structure carrying the disks 124 is carried and which carry upon their inner ends the beveled gears 121. These bearing plates 159 support the outer ends of the traveler guide rods 147, as shown in Fig. 11. The rock bars 158 at their inner ends are each connected with a leg 160 of a substantially U-shaped rock frame indicated generally by the numeral 161, the yoke portion 162 of which extends across or straddles the gear 141. This frame projects rearwardly as shown in Fig. 12, and has pivotally attached to the central part of the yoke portion as at 163, an end of an actuating link 164. As previously stated, the disk housings 128 are controlled by the operator of the machine, by mechanism of the same character shown in Figs. 1 and 2 for the control of the disk housing 34, and this same mechanism also is employed for the control of the rock bars 158 to effect the driving of the shafts 107 and 108 in the forward or reverse direction or for setting the rock bars in a neutral position.

Each of the oscillatable control rods 158 extends through the passages 148 of a pair of travelers 144 and passes over the pair of pawls 153 in each traveler and the intermediate arm 155, contacting the balls 157 which the arm carries. Upon reference to Fig. 16, it will be readily seen that when the bars 158 are rocked on their longitudinal axes, they will effect the rocking of the double pawls 153 in each of the travelers through which they pass so that these pawls may be caused to move into either of the two engaging positions which they are capable of taking with respect to the adjacent ratchets or into a neutral position where the pawls and ratchets are completely disengaged one from the other. As shown in Fig. 12, control mechanism similar to that of Fig. 1 is connected with the control rods 158 and with the disk housing 128, whereby these parts may be shifted as desired through the medium of the indicator 74' and the pedal units 69' and 85'. The disk 74' is mounted upon a suitable shaft 71 supported on a support 62'. Also rotatably connected to the support 62' is one end of a shaft 165 which at its other end terminates adjacent the link 164 and carries an eccentric pin 166 with which the other end of the link 164 is connected whereby upon turning of the shaft 165, the link will be actuated to oscillate the frame 161.

The shaft 165 also carries a mutilated gear pinion 167 which is arranged for engagement by the teeth of a mutilated gear 168 which is secured to the shaft 71. The arrangement of these gears together with the control disk 74' is the same as shown in Fig. 1, so that the turning of the disk 74' in a counterclockwise direction will eventually effect the coupling of the gears 167—168 so as to actuate the rods 158 to shift the pawls 153 in the proper direction to effect reverse rotation of the shafts 107—108.

At the same time that the indicator disk 74' is turned to the reverse drive position, the cam 72' will be turned to actuate the gear segment 67' and effect the turning of the screw 64' on which is mounted the nut 66'. In this modified form of the control mechanism, however, the nut 66' does not effect the oscillation of the disk housings 128 as does the nut 66 of the structure of Fig. 1. This turning or oscillation of the disk housing is effected by the nuts 133, as previously stated, and these nuts are shifted by the turning of the screws 132. The turning of these screws is effected through the medium of the shaft 169 which at one end is joined with the screw 64' and extends from the screw to the shaft 131 where it carries a bevel gear 170 which is in toothed connection with a similar gear 171 which is carried on the shaft 131.

In this modified form of the control mechanism, the nut 66' when shifted rearwardly functions solely for the establishment of a direct drive between the shaft 109 and the shafts 107—108. This action is accomplished by the shifting of the cone 110 through the medium of the lever 172 which is coupled with the parts 77', 79' by the shift bar 173.

It is not believed necessary to give a statement of the operation of the treadle 85, the part 77' and 79' and the other parts connected therewith and not specifically identified, in view of the fact that these parts have their counterparts illustrated in connection with the structure of Figs. 1 and 2, and their operation has been specifically set forth in connection with these structures, such operation being the same in connection with the modified control mechanism of Fig. 12.

When a direct drive is established between the shafts 109, 108, 107, the rocking pawls may be shifted by the bars 158 to a neutral position where they will have both of their ends lifted out of contact with the adjacent ratchets 150, so that a complete disconnection of the travelers from the driven shaft may be accomplished, although this is not necessary for the operation of the direct drive.

It will be understood, of course, that when the shafts 107—108 are to be reversely rotated, this as previously stated, will be accomplished through the oscillation of the rods 158 by the turning of the disk 74'. When the disk is so turned to mesh the teeth of the gears 167—168, the pawls 153 will be oscillated by the rocking of the bars 158 from the positions in which they are shown in Fig. 16 to positions where the opposite ends thereof will be in contact with the ratchets 150. This will accomplish reverse turning of the shafts as the travelers are reciprocated by the disks 124 and the arms which couple them to the travelers.

From the foregoing, it will be readily apparent that in the mechanism illustrated in Fig. 11, means is provided for delivering power from a driving shaft to a right angularly related driven shaft and for smoothly varying the speed of rotation of the driven shafts so that such mechanism may be readily employed as a rear axle construction for a motor vehicle or the like, and it will also be readily apparent that with the novel arrangement shown in this structure of Fig. 11, the necessity for using a separate reversing mechanism such as is disclosed in connection with Fig. 1, is eliminated, the reversal when desired being accomplished through the medium of the rocking pawls.

While the details of construction, proportions and the particular arrangement of parts as shown in the drawings, are for the purpose of illustrating the transmission apparatus and its mechanism, it is to be understood that many changes might be made in these details without departing from the spirit of the invention as defined in the appended claims.

What is claimed is:

1. A change speed transmission gear, including coupled driving and driven shafts, arranged to have independent rotation, the driven shaft having two intersecting spiral grooves of different hand, a traveler on the driven shaft, the traveler including means for alternately engaging the spiral grooves to cause a continuous rotary movement of the shaft by a reciprocation of the traveler, and rotary means coaxial with and freely rotatable about the driven shaft and driven by the driving shaft which is constructed and arranged to translate rotary motion of the driving shaft into reciprocatory motion of the traveler to effect turning of the driven shaft.

2. A change speed transmission gear, including a driving shaft, a driven shaft, the shafts having adjacent ends coupled together for independent turning the driven shaft having two intersecting spiral grooves of different hand, a traveler on the driven shaft, the traveler including means for alternately engaging the spiral grooves to cause a continuous rotary movement of the shaft by a reciprocation of the traveler, a rotating disk disposed concentric to and penetrated by the driven shaft, means operatively connected to the driving shaft to be rotated therewith and operatively connected to the disk to rotate it, manually operable means for adjusting the disk into any one of a plurality of angular relations to the driven shaft, and a link connecting the traveler to the disk.

3. A change speed transmission gear, including a driving shaft, a driven shaft, the shafts having adjacent ends coupled together for independent turning the driven shaft having two intersecting spiral grooves of different hand, a traveler on the driven shaft, the traveler including means for alternately engaging the spiral grooves to cause a continuous rotary movement of the shaft by a reciprocation of the traveler, a disk disposed concentric to and penetrated by the driven shaft, means operatively driven from the driving shaft for rotating the disk, means connecting the disk to the traveler, and means for manually adjusting the disk into any one of a plurality of angular relations to the axis of the driven shaft.

4. A change speed transmission gearing, including a driving shaft, a driven shaft, the driven shaft having two intersecting spiral grooves of different hands, a plurality of travelers on the shaft, each traveler including means for alternately engaging the two spiral grooves to cause a continuous rotary movement of the driven shaft by a reciprocation of the travelers, means for causing a reciprocation of the travelers in predetermined directions relative to each other, said means being rotatable around the driven shaft and coupled with and being driven from the driving shaft, and manually operable means for controlling the length of stroke of each of said travelers.

5. A change speed transmission gearing, including a driving shaft, a driven shaft, the driven shaft having two intersecting spiral grooves of different hands, a plurality of travelers on the shaft, each traveler including means for alternately engaging the two spiral grooves to cause a continuous rotary movement of the driven shaft by a reciprocation of the travelers, a rotary disk mounted concentrically with and penetrated by the driven shaft and shiftable into any one of a plurality of angular relations to the axis of the driven shaft, means operated by the driving shaft for rotating the disk about the driven shaft, links connected at separated points to the disk and connected respectively to the travelers, and manually operable means for shifting the disk into any one of a plurality of angular relations to the driven shaft.

6. A change speed transmission gearing, including a driving shaft, a driven shaft, the driven shaft having two intersecting spiral grooves of different hands, a plurality of travelers on the shaft, each traveler including means for alternately engaging the two spiral grooves to cause a continuous rotary movement of the driven shaft by a reciprocation of the travelers, a rotary disk mounted concentrically with and penetrated by the driven shaft and shiftable into any one of a plurality of angular relations to the axis of the driven shaft, means operated by the driving shaft for rotating the disk about the driven shaft, links connected at separated points to the disk and connected respectively to the travelers, and manually operable means for shifting the disk into any one of a plurality of angular relations to the driven shaft, including a screw, a nut engaged by the screw and movable therealong and having linked operative connection to the disk, and manually operable means for shifting said screw in one direction or the other.

7. A change speed transmission gearing, including a driving shaft, a driven shaft, the driven shaft having two intersecting spiral grooves thereon of different hand, a plurality of travelers on the shaft, each traveler including means for alternately engaging the grooves to cause a continuous rotary movement of the shaft in one direction by a reciprocation of the travelers, a rotary disk centrally penetrated by the driven shaft, means for turning the disk from the driving shaft, including means pivotally supporting the disk for movement into any one of a plurality of angular relations to the axis of the driven shaft, links connecting the disk from circumferentially separated points to said travelers, an annular element encircling the driven shaft and engaging the periphery of the disk and within which said disk rotates, and manually controlled means connected to the annular element whereby the angle of the disk may be adjusted.

8. A change speed transmission gearing, including a driving shaft, a driven shaft, the driven shaft having two intersecting spiral grooves thereon of different hand, a plurality of travelers on the shaft, means on each traveler alternately engaging the grooves to cause a continuous rotary movement of the shaft in one direction by a reciprocation of the travelers, a rotary disk centrally penetrated by the driven shaft, means for turning the disk from the driving shaft, including means pivotally supporting the disk for movement into any one of a plurality of angular relations to the axis of the driven shaft, links connecting the disk from circumferentially separated points to said travelers, an annular element encircling the driven shaft and engaging the periphery of the disk and within which said disk rotates, means to adjust the annular element, including a screw, a nut traveling thereon, a link connecting the nut to the annular element, a sector gear operatively engaging the screw to rotate it, and a pedal connected to the sector gear.

9. A change speed transmission gearing, including a driving shaft, a driven shaft, the driven shaft having two intersecting spiral grooves thereon of different hand, a plurality of travelers on the shaft, means on each traveler alternately engaging the grooves to cause a continuous rotary movement of the shaft in one direction by a reciprocation of the travelers thereon, a rotary disk centrally penetrated by the driven shaft, means for turning the disk from the driving shaft, including means pivotally supporting the disk for movement into any one of a plurality of angular relations to the axis of the driven shaft, links connecting the disk from circumferentially separated points to said travelers, an annular element encircling the driven shaft and engaging the periphery of the disk and within which said disk rotates, means to adjust the annular element, including a screw, a nut traveling thereon, a link connecting the nut to the annular element, a sector gear operatively engaging the screw to rotate it, a pedal connected to the sector gear, a spring urging the pedal into a predetermined position, and manually adjustable means for variably limiting the movement of the pedal under the action of said spring.

10. A change speed transmission gearing, including a driving shaft, a driven shaft, the driven shaft having two intersecting spiral grooves thereon of different hand, a plurality of travelers on the shaft, means on each traveler alternately engaging the grooves to cause a continuous rotary movement of the shaft in one direction by a reciprocation of the travelers thereon, a rotary disk centrally penetrated by the driven shaft, means for turning the disk from the driving shaft, including means pivotally supporting the disk for movement into any one of a plurality of angular relations to the axis of the driven shaft, links connecting the disk from circumferentially separated points to said travelers, an annular element encircling the driven shaft and engaging the periphery of the disk and within which said disk rotates, means to adjust the annular element, including a screw, a nut traveling thereon, a link connecting the nut to the annular element, a sector gear operatively engaging the screw to rotate it, a pedal connected to the sector gear, a spring urging the pedal into a predetermined position, manually adjustable means for variably limiting the movement of the pedal under the action of said spring, including a cam with the cam face of which the pedal has operative engagement, and manually operative means for rotatably adjusting the cam.

11. A transmission mechanism of the character described, including a driving shaft and a driven shaft, a sleeve surrounding the driving shaft, clutch actuating mechanism constructed and arranged to operatively connect the sleeve to the driving shaft when the clutch is thrown in, a loose beveled gear wheel, a clutch disposed between the loose beveled gear wheel and the clutch actuating mechanism, a sleeve surrounding the driven shaft and carrying a pair of beveled gear wheels engageable with the first-named beveled gear wheel, a fixed beveled gear wheel with which the second-named beveled gear wheels engage, a rotary disk pivotally mounted upon said sleeve for movement into any one of a plurality of angular relations to the driven shaft, the disk having a central opening through which the driven shaft extends a pivotally supported annular element in which said disk is rotatably mounted, manually operable means engaging the annular element and constructed and arranged to shift the annuar element and the disk upon the pivot of the annular element to thereby adjust the angularity of the disk with respect to the axis of the driven shaft, intersecting screw threads formed upon the driven shaft, the threads being of opposite hand, a pair of travelers mounted upon the driven shaft and held from rotary movement, links connecting said travelers to spaced portions of said disk, and means on the travelers engageable with said threads and constructed and arranged to cause a continuous rotation of the driven shaft in one direction upon a reciprocation of the travelers thereon.

12. A transmission mechanism of the character described, including a driving shaft and a driven shaft, a sleeve surrounding the driving shaft, clutch actuating mechanism constructed and arranged to operatively connect the sleeve to the driving shaft when the clutch is thrown in, a loose beveled gear wheel, a clutch disposed between the loose beveled gear wheel and the clutch actuating mechanism, a sleeve surrounding the driven shaft and carrying a pair of beveled gear wheels engageable with the first-named beveled gear wheel, a fixed beveled gear wheel with which the second-named beveled gear wheels engage, a rotary disk pivotally mounted upon said sleeve for movement into any one of a plurality of angular relations to the driven shaft, the disk having a central opening through which the driven shaft extends a pivotally supported annular element in which said disk is rotatably mounted, manually operable means engaging the annular element and constructed and arranged to shift the annular element and the disk upon the pivot of the annular element to thereby adjust the angularity of the disk with respect to the axis of the driven shaft, intersecting screw threads formed upon the driven shaft, the threads being of opposite hand, a pair of travelers mounted upon the driven shaft and held from rotary movement, links connecting said travelers to spaced portions of the disk, means on the travelers engageable with said threads and constructed and arranged to cause a continuous rotation of the driven shaft in one direction upon a reciprocation of the travelers thereon, and manually operable means constructed and arranged to secure a direct drive between the driving shaft and the driven shaft and simultaneously disconnect the clutch actuating means from said clutch.

13. A transmission mechanism of the character described, including a driving shaft and a driven shaft, a sleeve surrounding the driving shaft, clutch actuating mechanism constructed and arranged to operatively connect the sleeve to the driving shaft when the clutch is thrown in, a loose beveled gear wheel, a clutch disposed between the loose beveled gear wheel and the clutch actuating mechanism, a sleeve surrounding the driven shaft and carrying a pair of beveled gear wheels engageable with the first-named beveled gear wheel, a fixed beveled gear wheel with which the second-named beveled gear wheel engages, a rotary disk pivotally mounted upon said sleeve for movement into any one of a plurality of angular relations to the driven shaft, the disk having a central opening through which the driven shaft extends a pivotally mounted annular element in which said disk is rotatably mounted, manually operable means engaging the annular element and constructed and arranged to shift the annular element and the disk upon the pivot of the annular element to thereby adjust the angularity of the disk with respect to the axis of the driven shaft, intersecting screw threads formed upon the driven shaft, the threads being of opposite hand, a pair of travelers mounted upon the driven shaft and held from rotary movement, links connecting said travelers to spaced portions of the disk, means on the travelers engageable with said threads and constructed and arranged to cause a continuous rotation of the driven shaft in one direction upon a reciprocation of the travelers thereon, the driven shaft having a screw thread adjacent to the driving shaft, the clutch actuating element having a tubular extension formed with internal threads out of engagement with the screw threads on the driven shaft when the clutch actuating element is shifted to engage with the first-named beveled gear wheel but engageable with the screw threads on the driven shaft when the clutch actuating element is shifted to disconnect the clutch from the first-named beveled gear wheel to thereby automatically secure a direct connection between the driving shaft and the driven shaft, and manually controllable means for shifting said clutch.

14. A transmission mechanism of the character described, including a driving shaft and a driven shaft, a sleeve surrounding the driving shaft, clutch actuating mechanism constructed and arranged to operatively connect the sleeve to the driving shaft when the clutch is thrown in, a loose beveled gear wheel, a clutch disposed between the loose beveled gear wheel and the clutch actuating mechanism, a sleeve surrounding the driven shaft and carrying a pair of beveled gear wheels engageable with the first-named beveled gear wheel, a fixed beveled gear wheel with which the second-named beveled gear wheel engages, a rotary disk pivotally mounted upon said sleeve for movement into any one of a plurality of angular relations to the driven shaft, the disk having a central opening through which the driven shaft extends, a pivotally mounted annular element in which said disk is rotatably mounted, manually operable means engaging the annular element and constructed and arranged to shift the annular element on its mounting and the disk to thereby adjust the angularity of the disk with respect to the axis of the driven shaft, intersecting screw threads formed upon the driven shaft, the threads being of opposite hand, a pair of travelers mounted upon the driven shaft and held from rotary movement, links connecting said travelers to spaced portions of said disk, means on the travelers engageable with said threads and constructed and arranged to cause a continuous rotation of the driven shaft in one direction upon a reciprocation of the travelers thereon, the driven shaft having a screw thread adjacent to the driving shaft, the clutch actuating element having a tubular extension formed with internal threads out of engagement with the screw threads on the driven shaft when the clutch actuating element is shifted to engage with the first-named beveled gear wheel but engageable with the screw threads on the driven shaft when the clutch actuating element is shifted to disconnect the clutch from the first-named beveled gear wheel to thereby automatically secure a direct connection between the driving shaft and the driven shaft, manually controllable means for shifting said clutch, including a clutch lever, a spring urging the clutch lever in a direction to shift the clutch actuating member into engagement with the clutch, and a rod connecting such clutch lever with said nut whereby when the nut is shifted on the screw beyond a predetermined point the rod will automatically retract the clutch.

15. A transmission mechanism of the character described, including a driving shaft and a driven shaft, a sleeve surrounding the driving shaft, clutch actuating mechanism constructed and arranged to operatively connect the sleeve to the driving shaft when the clutch is thrown in, a loose beveled gear wheel, a clutch disposed between the loose beveled gear wheel and the clutch actuating mechanism, a sleeve surrounding the driven shaft and carrying a pair of beveled gear wheels engageable with the first-named beveled gear wheel, a fixed beveled gear wheel with which the second-named beveled gear wheel engages, a rotary disk pivotally mounted upon said sleeve for movement into any one of a plurality of angular relations to the driven shaft, the disk having a central opening through which the driven shaft extends, a pivotally mounted annular element in which said disk is rotatably mounted, manually operable means engaging the annular element and constructed and arranged to shift the annular element on its mounting and the disk to thereby adjust the angularity of the disk with respect to the axis of the driven shaft, intersecting screw threads formed upon the driven shaft, the threads being of opposite hand, a pair of travelers mounted upon the driven shaft and held from rotary movement, links connecting said travelers to spaced portions of the disk, means on the travelers engageable with said threads and constructed and arranged to cause a continuous rotation of the driven shaft in one direction upon a reciprocation of the travelers thereon, the driven shaft having a screw thread adjacent to the driving shaft, the clutch actuating element having a tubular extension formed with internal threads out of engagement with the screw threads on the driven shaft when the clutch actuating element is shifted to engage with the first-named beveled gear wheel but engageable with the screw threads on the driven shaft when the clutch actuating element is shifted to disconnect the clutch from the first-named beveled gear wheel to thereby automatically secure a direct connection between the driving shaft and the driven shaft, manually controllable means for shifting said clutch, including a clutch lever, a spring urging the clutch lever in a direction to shift the clutch actuating member into engagement with the clutch, a rod connecting such clutch lever with said nut whereby when the nut is shifted on the screw beyond a predetermined point the rod will automatically retract the clutch, and manually controlled means for independently shifting said clutch lever to shift the clutch to a clutching position.

16. A structure as in claim 2, further characterized by the provision of an additional driven shaft in alinement with the first-named driven shaft, and shiftable means constructed and arranged to drive the auxiliary driven shaft in the same direction as the first-named driven shaft or in a reverse direction thereto.

17. A structure as defined in claim 2, further characterized by the provision of an auxiliary driven shaft alined with the first-named driven shaft, a fixed frame in which the adjacent ends of both shafts are journaled, confronting beveled gear wheels on each of said shaft ends, an annular carrier, beveled gears mounted on the carrier and disposed to mesh with both of the first-named beveled gear wheels, a gear wheel mounted in connection with the first-named gear wheel, a rotatable slide adapted when in one position to have locking engagement with the last-named gear wheel and with the carrier to thus cause the carrier to rotate with the last-named gear wheel and a fixed internal gear on the frame, the slide being shiftable into locking engagement with the internal gear wheel and with the carrier to lock the carrier from movement, and manually shiftable means for shifting said slide, said means permitting the free rotation of the slide.

18. A change speed transmission mechanism, comprising a driving shaft, a pair of alined driven shafts disposed perpendicular to the driving shaft, the driven shafts each having two intersecting spiral grooves of different hands, a traveler on each driven shaft, each traveler including means for alternately engaging the two grooves of the supporting shaft to cause continuous rotary movement of the driven shafts by reciprocation of the travelers, a rotary disk annulus mounted concentrically with and encircling each driven shaft and supported for oscillation into any of a plurality of angular positions relative to the driven shaft, means coupling the driving shaft with said disks for imparting rotary movement thereto, a link coupling each disk with the traveler on the shaft adjacent the disk, and manually operable means connected with and common to said disks for oscillating the same together to a desired angular relation with the encircled driven shafts.

19. A change speed transmission mechanism, comprising a driving shaft, a pair of alined driven shafts disposed perpendicular to the driving shaft, the driven shafts each having two intersecting spiral grooves of different hands, a traveler on each driven shaft, each traveler including means for alternately engaging the two grooves of the supporting shaft to cause continuous rotary movement of the driven shafts by reciprocation of the travelers, a rotary disk annulus mounted concentrically with and encircling each driven shaft and supported for oscillation into any of a plurality of angular positions relative to the driven shaft, means coupling the driving shaft with said disks for imparting rotary movement thereto, a link coupling each disk with the traveler on the shaft adjacent the disk, manually operable means connected with and common to said disks for oscillating the same together to a desired angular relation with the encircled driven shafts, the said means carried by the travelers for alternately engaging the two grooves of the shafts including oscillatable double pawls and ratchets, the said pawls being adapted to have three driving positions with respect to the ratchets corresponding to forward, reverse and neutral, and mechanism coupled with the pawls of the travelers facilitating the adjusting of the pawls to any one of the said positions from a point remote from the mechanism and while the mechanism is in operation.

20. A change speed transmission gear including coupled driving and driven shafts arranged to have independent rotation, the driven shaft having two intersecting spiral grooves of different hand, a traveler on the driven shaft, the traveler including means for alternately engaging the spiral grooves to cause a continuous rotary movement of the shaft by a reciprocation of the traveler, rotary means coaxial with and freely rotatable about the driven shaft and driven by the driving shaft which is constructed and arranged to translate rotary motion of the driving shaft into reciprocatory motion of the traveler to effect turning of the driven shaft, and mechanism for cutting out the transmission of driving power from the driving shaft to the driven shaft through said rotary means and establishing a direct coupling of the driving and driven shafts together.

21. A change speed power transmission mechanism, comprising a rotatable driving element, a rotatable driven element, an annular guide encircling the axis of rotation of the driven element, means supporting said guide for turning on an axis perpendicular to the first-mentioned axis whereby said guide may be set in an angular plane of adjustment relative to the first axis, an annular disk set coaxially in said guide to turn therein, means coupling the disk to the driving element for effecting rotation of the disk by the driving element, and an operative driving coupling between the disk and the driven element which is so constructed and arranged that the rotary speed imparted to the driven element will be varied with changes in the angular plane of the guide and the disk carried thereby.

22. A transmission mechanism, comprising a drive shaft, a pair of driven shafts in end alined relation perpendicular to the drive shaft, a pair of units each supported for rotation about and independently of a driven shaft and operatively coupled with the drive shaft, an annular disk encircling each unit and coupled therewith for oscillation on an axis radial to the disk and perpendicular to the axis of rotation of the unit, means for effecting the oscillation of the disk on its radial axis into a selected plane which is angular to the driven shaft axis and maintaining the disk for turning in said plane, and a driving coupling between each disk and a driven shaft which is so constructed and arranged that the speed at which the driven shafts are turned is varied with changes in the angle of said plane.

23. A transmission mechanism, comprising a drive shaft, a pair of driven shafts in end alined relation perpendicular to the drive shaft and extending across an end thereof, a pair of cylindrical units each having a driven shaft extending axially therethrough and supported for rotation on said axis, each of said units including a miter gear, a miter gear operatively coupled with the drive shaft to turn therewith and operatively coupled with the gears of said units, a collar encircling each unit and coupled therewith for oscillation on a radial axis extending through the rotary axis of the unit, an annular disk encircling each collar and pivotally coupled therewith for oscillation on a radial axis perpendicular to the axis of oscillation of the collar, means for effecting the oscillation of the disks on their radial axes into selected planes which are angular to the axes of the driven shafts and maintaining the disks for turning in such planes, and a driving coupling between each disk and a driven shaft which is so constructed and arranged that the speed at which the driven shafts are turned is varied with changes in the angles of said planes.

24. A transmission mechanism, comprising a drive shaft, a pair of driven shafts in end alined relation perpendicular to the drive shaft and extending across an end thereof, a pair of cylindrical units each having a driven shaft extending axially therethrough and supported for rotation on said axis, each of said units including a miter gear, a miter gear operatively coupled with the drive shaft to turn therewith and operatively coupled with the gears of said units, a collar encircling each unit and coupled therewith for oscillation on a radial axis extending through the rotary axis of the unit, an annular disk encircling each collar and pivotally coupled therewith for oscillation on a radial axis perpendicular to the axis of oscillation of the collar, means for effecting the oscillation of the disks on their radial axes into selected planes which are angular to the axes of the driven shafts and maintaining the disks for turning in such planes, a driving coupling between each disk and a driven shaft which is so constructed and arranged that the speed at which the driven shafts are turned is varied with changes in the angles of said planes, an auxiliary drive shaft coaxial with the drive shaft and supported for rotation independently thereof, an operative coupling between said auxiliary shaft and a driven shaft, and mechanism for selectively establishing a direct driving coupling between the drive shaft and the auxiliary drive shaft.

WILLIAM BROWN BELL.